United States Patent [19]

Strain et al.

[11] Patent Number: 4,947,674

[45] Date of Patent: Aug. 14, 1990

[54] LIMIT SWITCH CALIBRATION SYSTEM

[75] Inventors: Kevin L. Strain, Camanche, Iowa; Jack A. Huizenga, Fulton, Ill.

[73] Assignee: Commonwealth Edison, Chicago, Ill.

[21] Appl. No.: 241,699

[22] Filed: Sep. 7, 1988

[51] Int. Cl.[5] .............................................. G01W 1/18

[52] U.S. Cl. ....................................................... 73/1 D

[58] Field of Search ............................... 73/1 D, 1 DC

[56] References Cited

U.S. PATENT DOCUMENTS

| | | | |
|---|---|---|---|
| 3,816,685 | 6/1974 | Fiore | 200/83 S |
| 3,824,358 | 7/1974 | Edwards et al. | 200/83 S |
| 3,846,600 | 11/1974 | Kolze et al. | 200/83 S |
| 4,262,178 | 4/1981 | Berlin, Jr. | 200/81 R |

*Primary Examiner*—Robert Raevis
*Attorney, Agent, or Firm*—Willian Brinks Olds Hofer Gilson & Lione

[57] ABSTRACT

A limit switch calibration checking device for a limit switch assembly of the type having at least one upper limit switch, at least one lower limit switch, and a limit switch mechanism that controls the upper and lower limit switches in response to movement of an input member. The calibration checking device includes a drive member adapted to engage the input member to drive the input member, a motor coupled to the drive member such that the motor is operative to move the drive member, a position indicator coupled to the drive member to measure travel of the drive member, and an electrical control circuit responsive to the upper and lower limit switches and operative to control the motor to automatically stop the motor in response to switching of a manually selectable one of the upper and lower limit switches. The disclosed calibration checking device can be used to measure the initial position of a limit switch and the travel required between the upper and lower limit switch points.

21 Claims, 3 Drawing Sheets

| CONTACTS | CLOSED CIRCUIT | OPEN CIRCUIT |
|---|---|---|
| 1-1C | C | I + T |
| 2-2C | C | I + T |
| 3-3C | I + T | C |
| 4-4C | I + T | C |
| 5-5C | T | I + C |
| 6-6C | T | I + C |
| 7-7C | I + C | T |
| 8-8C | I + C | T |

LIMIT SWITCH CALIBRATION SYSTEM

BACKGROUND OF THE INVENTION

This invention relates to a calibration checking device and related method for setting and calibrating limit switches.

Many complex systems such as nuclear power plants include a large number of motor driven devices such as valves. Typically limit switches are provided on motor driven valves to allow the valves to be remotely opened and closed. One commonly used limit switch is sold under the trade name "Limitorque." Such limit switches have at least one upper limit switch, at least one lower limit switch, and a limit switch mechanism for controlling the upper and lower limit switches in response to movement of an input member such as a gear. Typically, these limit switches are used in situations where separate signals are needed to define the points at which the motor should be deactivated as the gate nears its open and closed positions.

Such limit switches must be removed periodically for servicing, and must occasionally be replaced. In either case, it is important that the reinstalled limit switch provide the desired switch points for the upper and the lower limit switches. This means that the travel between the upper and lower limit switches must be within specification, and the position of the limit switch must correspond to the position of the valve.

For example, when limit switches are removed for cleaning and regreasing, internal gears of the limit switch mechanism can easily be moved from their original setting. If such an error occurs and is not detected before the limit switch is reinstalled, the limit switches will have to be recalibrated after installation onto the valve. This means costly delays in terms of increased down-time and it may involve unnecessary radiation exposure for maintenance personnel. If the miscalibration of the limit switch were undetected entirely, there would be a possibility for valve over-travel and resulting valve damage, because it is the limit switches that control the range of valve travel.

Limit switches have been manually calibrated in the past while removed from valves and the like. However, simple manual calibration is prone to error, since the calibration process is under manual control.

Thus, a need exists for an improved system for calibrating limit switches that is accurate, consistent, and that operates with minimal opportunity for human error. Preferably, such a system should minimize radiation exposure for maintenance personnel, as well as down-time and calibration time.

SUMMARY OF THE INVENTION

The present invention provides a limit switch calibration checking device for a limit switch of the type described above. This device includes a drive member adapted to engage the input member of the limit switch to drive the input member. A motor is coupled to the drive member such that the motor is operative to move the drive member, and a position indicator is coupled to the drive member to measure travel of the drive member. An electrical control circuit is responsive to the upper and lower limit switches and is operative to control the motor to automatically stop the motor in response to switching of a manually selectable one of the upper and lower switches.

According to the method of this invention, a limit switch calibration checking device as described above is used to check calibration of a limit switch. First, the limit switch is demounted while the limit switch mechanism is immobilized to preserve an initial position of the limit switch mechanism. The limit switch is then mounted on a calibration checking device as described above, and the device is used to automatically drive the limit switch mechanism to a first position defined by the switching of a first selected one of the limit switches and automatically to measure the travel of the drive member between the initial and first positions. Then the calibration checking device is used to automatically drive the limit switch mechanism to a second position defined by the switching of a second selected one of the limit switches, and automatically to measure travel of the drive member between the first and second positions.

Once these two measurements have been made, it is a straightforward matter to return the limit switch to its original condition after maintenance. In the event the limit switch mechanism is not disturbed during maintenance, the method described above can simply be repeated to confirm proper calibration and positioning of the limit switch mechanism. Alternately, if this recheck uncovers a problem, the limit switch mechanism can be recalibrated and then again rechecked.

This invention substantially overcomes the problems of the prior art discussed above. In particular, this invention provides a calibration system which allows rapid, accurate and reliable calibration of a limit switch, prior to mounting of the limit switch into its final position. Thus, calibration can be accomplished with no radiation exposure to maintenance personnel, and the limit switch can be prepared for a rapid, reliable installation which minimizes down-time and radiation exposure to personnel, while providing an excellent degree of accuracy and reliability.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
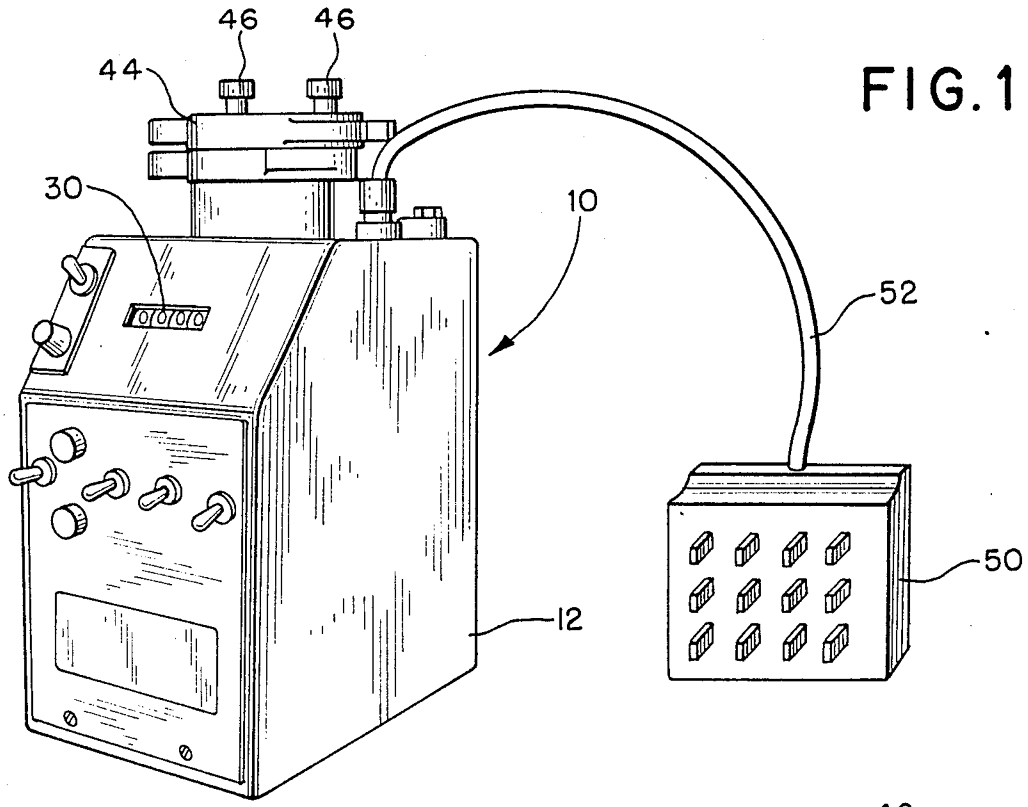
FIG. 1 is a front perspective view of a preferred embodiment of the calibration checking device of this invention.
Figure 2:
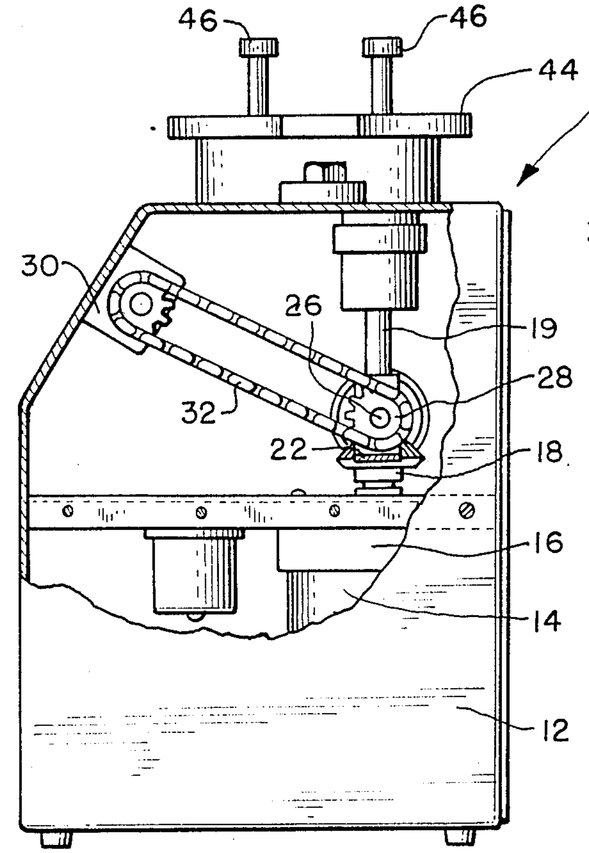
FIG. 2 is a left side view in partial cutaway of the calibration checking device of FIG. 1.
Figure 3:
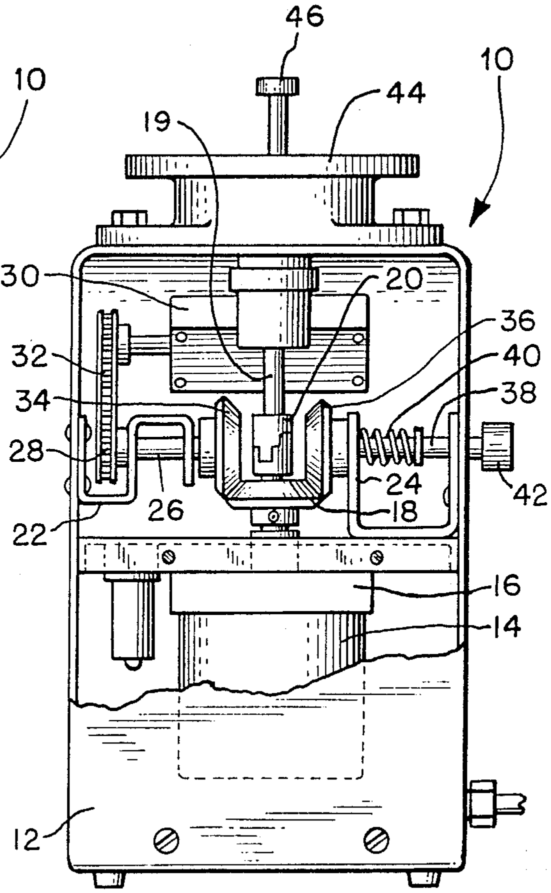
FIG. 3 is a rear view in partial cutaway of the calibration checking device of FIG. 1.

Turning now to the drawings. FIG. 1 shows a front perspective view of a preferred embodiment 10 of the calibration checking device of this invention, which includes an outer housing 12. For ease of reference this device will be referred to as a "calibration device" below. As shown in FIGS. 2 and 3, a reversible electric motor 14 is mounted in a lower part of the housing 12. This motor 14 drives a gear reduction assembly 16 which is in turn coupled to an output gear 18. In this embodiment, the motor 14 and gear reduction assembly 16 are selected to provide an output speed for the output gear 18 of 100 rpm when the motor 14 is operating. The gear reduction assembly 16 also drives a shaft 19 via a coupling 20. This shaft 19 drives a limit switch mounting assembly 44 which includes a drive member 46 that extends up out of the top of the mounting assembly 44. In the embodiment shown, the limit switch mounting assembly 44 includes two drive members 46 mounted parallel to one another. Thus, the motor 14 operates to rotate the drive members 46.

The output gear 18 is coupled via a mating gear 34 with a shaft 26 mounted for rotation in a bracket 22. A sprocket 28 is mounted to the shaft 26, and the sprocket 28 is coupled to a counter 30 via a chain 32. The counter 30 is a conventional resettable digital counter which provides an indication of travel of the output gear 18 and therefore of the drive members 46.

A gear 36 is mounted to a shaft 38 that rotates in a bracket 24. This shaft 38 is biased by a spring 40 to maintain the gear 36 normally out of engagement with the output gear 18. A manual drive knob 42 is mounted to the shaft 38 outside of the housing 12. During periods when the motor 14 is not operating, the output gear 18 (and therefore the drive members 46 and the counter 30) can be driven by manually pushing the manual drive knob 42 inwardly, against the bias of the spring 40, to cause the gear 36 to mesh with the output gear 18. The manual drive knob 42 can then be used to rotate the output gear 18.

The calibration device 10 also includes a switch block assembly 50 which is connected to the calibration device 10 by a multiconductor cable 52. The switch block assembly 50 connects to a conventional limit switch assembly 60 (FIG. 4) to couple the limit switch assembly 60 to the control circuit of the calibration device 10 described below. The switch block assembly 50, as described in greater detail below, includes contacts for eight separate switches that are controlled by the limit switch assembly 60.

Figure 4:
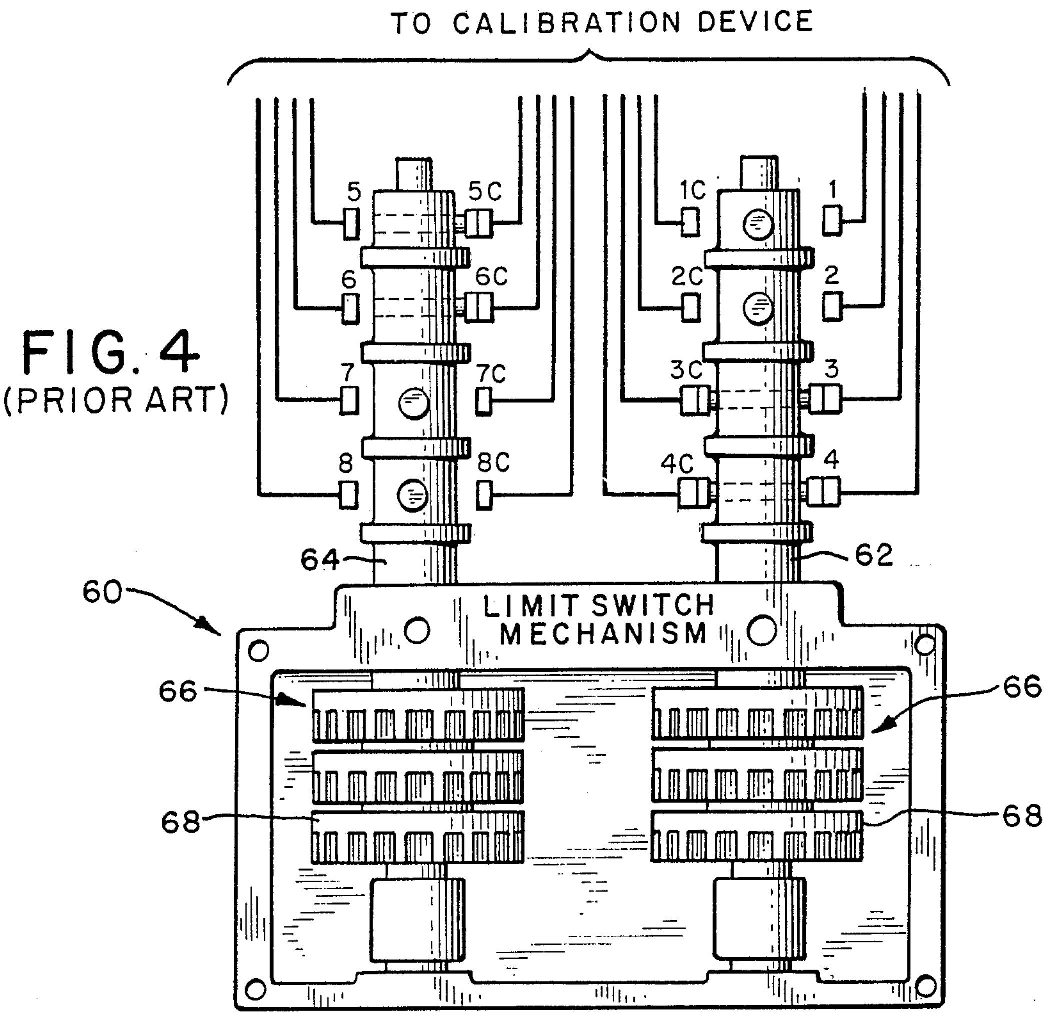
FIG. 4 (PRIOR ART)
FIG. 4 is a schematic view of a prior art limit switch assembly suitable for use with the calibration checking device of FIG. 1.

Turning now to FIG. 4, the calibration device 10 is designed for use with a conventional limit switch assembly 60 such as that shown in FIG. 4. The limit switch assembly 60 includes first and second limit switch rotors 62, 64, the positions of which are controlled by a limit switch mechanism 66 in response to rotation of input members 68.

Because the limit switch assembly 60 is conventional in design, the detailed workings of the limit switch mechanism 66 will not be described in detail here. Such limit switches are sold generally under the trade name "Limitorque."

Generally speaking, the limit switch assembly 60 includes a limit switch mechanism 66 which rotates each of the limit switch rotors 62, 64 after a selected travel of the input members 68. Each of the rotors 62, 64 has two positions, separated from each other by an angle of 90 degrees, and each of the limit switch rotors 62, 64 includes the switching contacts for four separate limit switches. In the schematic diagram of FIG. 4, the upper two contacts 1,2 of the rotor 62 are shown in the open circuit position, and the lower two contacts 3,4 of the rotor 62 are shown in the closed circuit position. The rotor 64 is shown in the alternate angular position, in which the upper two contacts 5,6 are shown in the closed switch position, and the lower two contacts 7,8 are shown in the open switch position.

Figure 5:
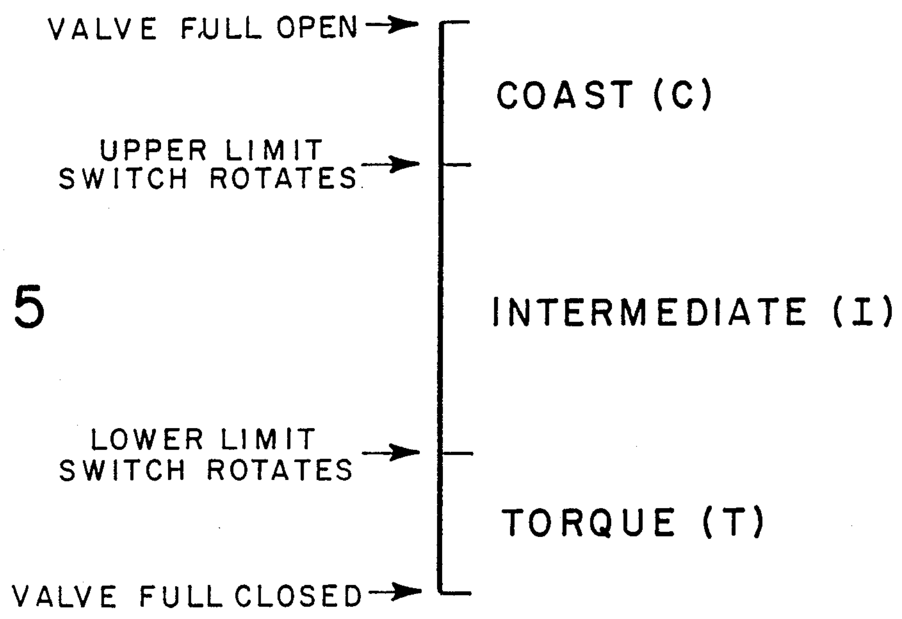
FIG. 5 is a schematic drawing showing three states of the limit switch mechanism of the limit switch assembly of FIG. 4.

FIG. 5 is a schematic diagram that clarifies the operation of the limit switch assembly 60 of FIG. 4. Typically, the limit switch assembly 60 is connected to a movable member such as a valve, and the valve is movable within a range of travel defined by the vertical line of FIG. 5. This range of travel is bounded at the upper end by the valve full open position and at the lower end by the valve full closed position. As the valve is opened from the full closed position, the lower limit switch rotor 64 rotates at a selected point. As the input members 68 are continuously rotated in the open valve direction, a point is then reached at which the upper limit switch rotor 62 rotates. The valve then continues to move to the full open position.

The switching of the upper and lower limit switch rotors 62, 64 can be used to define three separate states of the limit switch mechanism 66: Torque (T), Intermediate (I) and Coast (C). In use, the valves can be driven by a motor (not shown) when the limit switch mechanism 66 is in the Intermediate state. For example, when the valve is being opened, the motor is maintained on until the upper limit switch rotor 62 rotates at the upper end of the Intermediate state. Then inertia in the motor and valve train allows the valve to coast to the full open position. Similarly, when the valve is being closed, the motor is driven until the lower limit switch rotor 64 rotates at the lower end of the Intermediate state. At this point, the motor is de-energized, and inertia in the motor and valve train causes the valve to continue to move toward the full closed position. Thus, when the limit switch assembly 60 is installed on a motor-driven valve, the motor is typically unpowered other than when the limit switch mechanism 66 is in the Intermediate state.

Figures 6, 7:
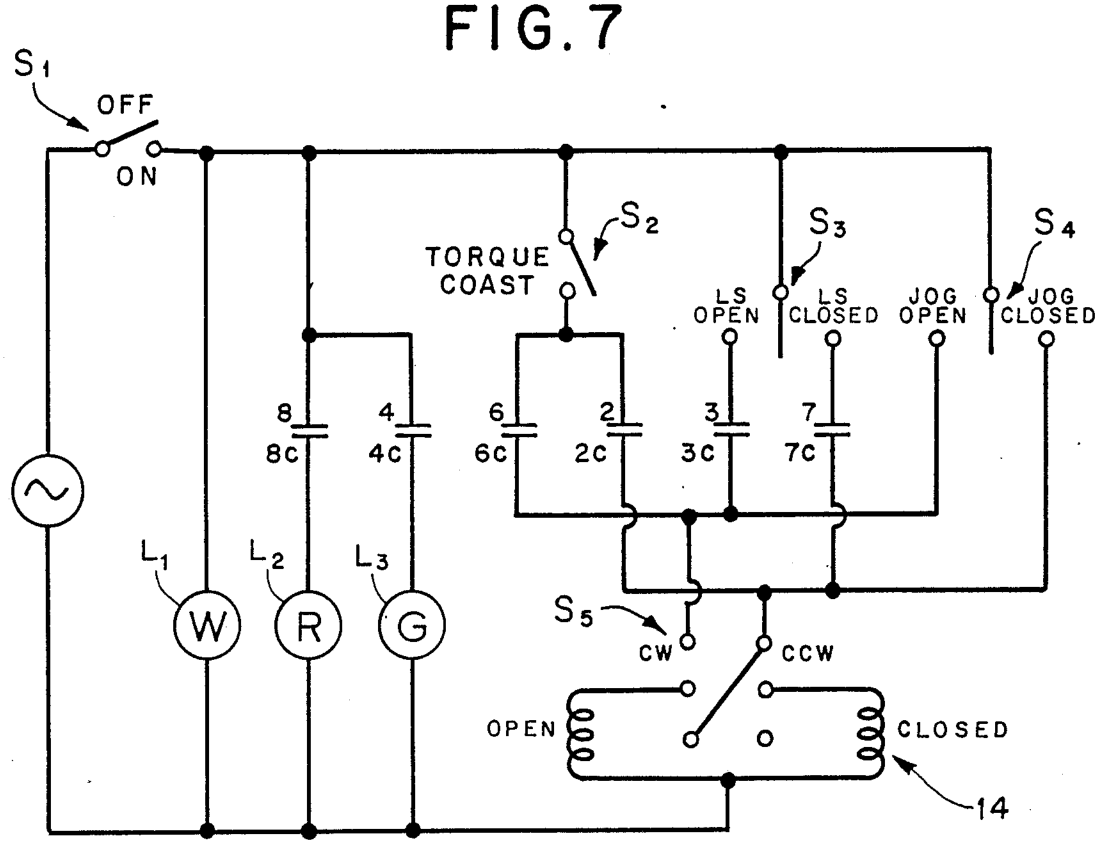
FIG. 6 is a table defining the state of the contacts of the limit switch assembly of FIG. 4.
FIG. 7 is a schematic diagram of the control circuit of the calibration checking device of FIG. 1.

FIG. 6 is a table that defines the manner in which the upper and lower limit switches 1 through 8 of the limit switch assembly 60 are controlled. In FIG. 6 the letters C, I and T designate the Coast, Intermediate and Torque states described above.

With this explanation, the schematic diagram of FIG. 7 can now readily be understood. In FIG. 7, the terminals 2-2C, 3-3C, 4-4C, 6-6C, 7-7C and 8-8C are six of the eight limit switches of the limit switch assembly 60 as defined in FIG. 6. As shown in FIG. 7, the calibration device 10 includes five toggle switches S1-S5. Switch S1 is simply a power switch which turns the calibrating device 10 on and off. Switch S2 is an on-off switch that is used when it is desired to move the limit switch assembly 60 while the limit switch mechanism 66 is in either the Coast or Torque states. Switch S3 is a three position switch which can be used to cause the limit switch assembly 60 to be driven while the switch mechanism 66 is in the Intermediate state toward either the Coast or Torque states. Switch S4 is a three position switch which can be used to cause the motor 14 to rotate under manual control, bypassing the limit switch assembly 60. Switch S5 can be used to select the direction of rotation of the motor 14.

In addition, the calibrating device 14 includes three lamps, L1, L2 and L3, which are white, red and green, respectively, in color. Lamp L1 is illuminated whenever the calibrating device 10 is powered. Lamp L2 is illuminated whenever the switch mechanism 66 is in the Intermediate or the Coast states. Lamp L3 is activated whenever the switch mechanism 66 is in the Intermediate or Torque states.

The switches S2, S3 are used to position the limit switch assembly 60 automatically to the switch point of either the upper or lower limit switch rotors 62, 64. For example, if the switch mechanism 66 is in the Torque state and the switch S2 is closed, the motor 14 will automatically be activated until the switch mechanism 66 leaves the Torque state and enters the Intermediate state, on the rotation of the lower limit switch rotor 64. Similarly, if the switch mechanism 66 is in the Coast state and the switch S2 is closed, the motor 14 will automatically be stopped when the switch mechanism 66 enters the Intermediate state, upon rotation of the upper limit switch rotor 62.

The switch S3 is used to stop the motor 14 when the limit switch mechanism 66 leaves the Intermediate state. If the switch S3 is moved to the limit switch open position (to the left in FIG. 7), the motor 14 will be stopped automatically when the limit switch mechanism 66 leaves the Intermediate state and enters the Coast state upon rotation of the upper limit switch rotor 62. Similarly, if the switch S3 is moved to the limit switch closed position (to the right in FIG. 7), the motor 14 will be automatically stopped when the switch mechanism 66 leaves the Intermediate state and enters the Torque state upon rotation of the lower limit switch rotor 64.

The switch S4 is used to activate the motor 14 without regard to the state of the limit switch mechanism 66. The switch S5 is used manually to select the desired direction of rotation of the motor 14 so as to either move the limit switch mechanism 66 toward the valve full open or full closed position, as shown in FIG. 5.

This invention is not limited to any particular components for implementing the functions described above. Nevertheless, the following table discloses components that have been found suitable in one application.

TABLE I

| No. | Description | Identification |
|---|---|---|
| 14 | Motor | Vicon Industries, Inc. 1800-0108-00(WM-1098) |
| 16 | Gear Reduction Unit | Vicon Industries, Inc. 1117-3018-01 |
| 20 | Coupling | Lovejoy L-035 |
| 30 | Counter | Durant 4-CS-73A3 |
| 44 | Limit Switch Mounting Assembly | Limitorque 10422 |
| 50 | Limit Switch Block Assembly | Limitorque 53549A |

In operation, the calibrating device 10 can be used to calibrate the limit switch assembly 60 in a simple and reliable manner. One preferred method for using the limit switch calibrating device 10 includes the following steps:

Step 1

Remove the limit switch assembly 60 from its mounted position and mount the limit switch assembly 60 on the limit switch mounting assembly 44. During this step it is important to prevent the limit switch mechanism 66 from moving from its initial position.

Step 2

Set the counter 30 to zero, turn all switches S1–S5 off, and then connect the calibrating device 10 to a power source and use switch S1 to apply power to the calibrating device 10.

Step 3

Turn the switch S2 on and monitor the counter 30. If the motor 14 is moving in the correct direction and the limit switch mechanism 66 began in either the Coast or Torque states, the motor 60 will soon stop. If this does not happen, then switch S2 off, reverse the direction of the motor 14 with switch S5, and again turn switch S2 on. In this way, the motor 14 will be caused to stop automatically as the limit switch mechanism 66 enters the Intermediate state. At this point, the counter should be recorded along with the motor direction. In this way, the initial position of the limit switch assembly 60 with respect to the switch points of one of the rotors 62, 64 is measured.

Step 4

Close switch S3 in either the limit switch open or limit switch closed direction so as to activate the motor 14 until the limit switch mechanism 66 leaves the Intermediate state. Then return switch S3 to the off position and again record the counter 30. This records the travel between the closures of the upper and lower limit switches. If there is an auxiliary rotor, the switch S4 can be used to jog the motor 14 manually to make similar measurements to these described above for the auxiliary rotor.

Step 5

Use the switch S3 to return the counter to zero and remove the limit switch assembly 60 from the calibrating device 10 for service.

Step 6

After the limit switch assembly 60 has been serviced, repeat the preceding steps 1–5 to confirm that the limit switch assembly 60 is in the same state as it was when it was removed from the valve. At this point, the limit switch assembly 60 is ready for remounting.

The foregoing method uses the calibrating device 10 to automatically measure two parameters of the limit switch assembly 60. The first parameter (the first counter reading in Step (3) indicates the initial position of the limit switch mechanism 66 with respect to either the upper or lower switch point. The second parameter (the difference between the first counter reading in Step 3 and the second reading of the counter 30 in Step (4) indicates the total travel between the two switch points. By automatically measuring these two parameters, the limit switch assembly 60 can simply and accurately be measured to ensure that it was not unintentionally altered during servicing of the limit switch assembly.

From the foregoing, it should be apparent that an improved calibrating device and method have been described which accurately, reliably and automatically stop the limit switch at selected limit switch closures and which automatically measure travel of the limit switch with respect to limit switch closures. As pointed out above, these features of the calibrating device 10 provide important operating advantages. Limit switches can be calibrated quickly, reliably and consistently with a minimum of down-time and a minimum of radiation exposure to maintenance personnel.

Of course, it should be understood that a wide range of changes and modifications can be made to the preferred embodiment described above. A variable speed motor can be substituted for the fixed speed motor described above, thereby eliminating the need for gear reduction and manual adjustment. The enclosure can be formed in any suitable manner, and welding techniques can be used to reduce fasteners. Electronic counters can be substituted for the mechanical counter shown, and various drive systems including toothed belts and the like can be substituted for the chain drive system shown. Finally, this calibrating device can be modified for use with other types of limit switch assemblies.

It is therefore intended that the foregoing detailed description be regarded as illustrative rather than limiting, and that it be understood that it is the following claims, including all equivalents, which are intended to define the scope of this invention.

We claim:

1. A limit switch calibration checking device for a limit switch assembly of the type having at least one upper limit switch, at least one lower limit switch, and a limit switch mechanism that controls the upper and lower limit switches in response to movement of at least one input member, said calibration checking device comprising:

a drive member adapted to engage the input member to drive the input member;

a motor coupled to the drive member such that the motor is operative to move the drive member;

means for indicating travel of the drive member as an aid to calibration of the limit switch assembly; and means for controlling the motor to cause the motor to stop automatically in response to switching of a selected one of the limit switches.

2. The device of claim 1 wherein the indicating means comprises a counter.

3. The device of claim 2 wherein the drive member is mounted for rotation, and wherein the counter provides an indication of revolutions of the drive member.

4. The device of claim 1 wherein the motor is reversible, and wherein the invention further comprises means for manually selecting a direction of motion for the motor.

5. The device of claim 1 further comprising means for manually driving the drive member.

6. The device of claim 1 wherein the limit switch mechanism defines upper, intermediate and lower states, wherein the upper limit switch switches between the upper and intermediate states, and wherein the lower limit switch switches between the intermediate and lower states.

7. The device of claim 6 wherein the controlling means is operative in a first mode to cause the motor to stop automatically when the limit switch mechanism leaves the intermediate state.

8. The device of claim 7 wherein the controlling means is operative in a second mode to cause the motor to stop automatically when the limit switch mechanism leaves the upper state.

9. The device of claim 8 wherein the controlling means is operative in a third mode to cause the motor to stop automatically when the limit switch mechanism leaves the lower state.

10. The device of claim 7 wherein the controlling means is operative in another mode to cause the motor to stop automatically when the limit switch mechanism enters the intermediate state.

11. The device of claim 7 wherein the drive member, motor, indicating means, and controlling means are housed in a modular, portable enclosure.

12. The device of claim 11 wherein the calibration device further comprises means, housed in the enclosure for visually indicating in which of the three states the limit switch mechanism is disposed.

13. A limit switch calibration checking device for a limit switch assembly of the type having at least one upper limit switch, at least one lower limit switch, and a limit switch mechanism that controls the upper and lower limit switches in response to movement of at least one input member, said calibration checking device comprising:

a drive member adapted to engage the input member to drive the input member;

a motor coupled to the drive member such that the motor is operative to move the drive member;

a position indicator coupled to the drive member to measure travel of the drive member as an aid to calibration of the limit switch assembly;

an electrical control circuit responsive to the upper and lower limit switches and operative to control the motor to automatically stop the motor in response to switching of a manually selectable one of the upper and lower limit switches.

14. The device of claim 13 wherein the drive member, motor, position indicator and control circuit are housed in a portable, modular enclosure.

15. The device of claim 14 wherein the limit switch mechanism defines upper, intermediate and lower states, wherein the upper limit switch switches between the upper and intermediate states, and wherein the lower limit switch switches between the intermediate and lower states.

16. The device of claim 15 wherein the control circuit is operative in a first mode to cause the motor to stop automatically when the limit switch mechanism leaves the intermediate state.

17. The device of claim 16 wherein the control circuit is operative in a second mode to automatically stop the motor when the limit switch mechanism enters the intermediate state.

18. The device of claim 16 wherein the calibration device further comprises means, housed in the enclosure, for visually indicating in which of the three states the limit switch mechanism is disposed.

19. The device of claim 14 wherein the drive member is mounted for rotation, and wherein the position indicator provides an indication of revolutions of the drive member.

20. The device of claim 19 wherein the motor is reversible, and wherein the invention further comprises means for manually selecting a direction of motion for the motor.

21. A method for calibrating a limit switch assembly of the type having at least one upper limit switch, at least one lower limit switch, and a limit switch mechanism that controls the upper and lower limit switches in response to movement of at least one input member, said method comprising the following steps:

(a) demounting the limit switch assembly from a mounted position while immobilizing the limit switch mechanism to preserve an initial position of the limit switch mechanism;

(b) mounting the limit switch assembly on a modular calibration checking device comprising:

a drive member adapted to engage the input member to drive the input member;

a motor coupled to the drive member such that the motor is operative to move the drive member;

a position indicator coupled to the drive member to measure travel of the drive member; and an electrical control circuit responsive to the upper and lower limit switches and operative to control the motor to automatically stop the motor in response to switching of a manually selectable one of the upper and lower limit switches;

(c) using the calibration checking device to automatically drive the input member to move the limit switch mechanism to a first position defined by the switching of a first selected one of the limit switches and to measure travel of the drive member between the initial and first positions; and (d) using the calibration checking device to automatically drive the limit switch mechanism to a second position defined by the switching of a second selected one of the limit switches and to measure travel of the drive member between the first and second positions.

* * * * *